United States Patent [19]

Savit

[11] 4,382,262

[45] May 3, 1983

[54] MULTICOLOR JET PRINTING

[76] Inventor: Joseph Savit, 751 Vernon Ave., Glencoe, Ill. 60022

[21] Appl. No.: 246,201

[22] Filed: Mar. 23, 1981

[51] Int. Cl.[3] .......... G01D 15/16

[52] U.S. Cl. .......... 346/1.1; 106/20; 346/46; 346/75; 346/135.1; 427/150

[58] Field of Search .......... 346/75, 140 R, 1.1, 346/135.1, 46; 106/22, 20; 427/150, 157, 145; 430/171, 173, 174

[56] References Cited

U.S. PATENT DOCUMENTS

| | | | |
|---|---|---|---|
| 1,882,043 | 10/1932 | Schroter | 178/96 X |
| 2,542,716 | 2/1951 | Slifkin | 430/173 |
| 3,063,050 | 11/1962 | Millis | 346/1.1 |
| 3,349,408 | 10/1967 | Gillen | 346/140 X |
| 3,772,017 | 11/1973 | Reichel | 430/171 X |
| 3,870,435 | 3/1975 | Watanabe . | |
| 3,889,271 | 6/1975 | Freytag | 346/1.1 |
| 3,906,141 | 9/1975 | Anderson | 346/75 X |
| 4,269,891 | 5/1981 | Minagawa | 346/135.1 X |

FOREIGN PATENT DOCUMENTS

| | | |
|---|---|---|
| 1050325 | 3/1979 | Canada . |
| 2240825 | 3/1975 | France . |
| 2269107 | 11/1975 | France . |
| 1298865 | 6/1972 | United Kingdom . |

OTHER PUBLICATIONS

Battison et al.; Diazo Printer, IBM TDB vol. 15 No. 11, Apr. 1973, p. 3418.

*Primary Examiner*—Joseph W. Hartary

*Attorney, Agent, or Firm*—Dressler, Goldsmith, Shore, Sutker & Milnamow, Ltd.

[57] ABSTRACT

A method is provided for jet printing in a plurality of colors on a substrate which is coated with one component of a dye. The jet printing nozzles direct droplets of liquid to the substrate containing the complementary dye components which produce a finished dye at the points of impact of the liquid onto the substrates. Different jet printing nozzles utilize different complementary dye components on the same substrate, producing different dyes and thereby different colors.

13 Claims, 1 Drawing Figure

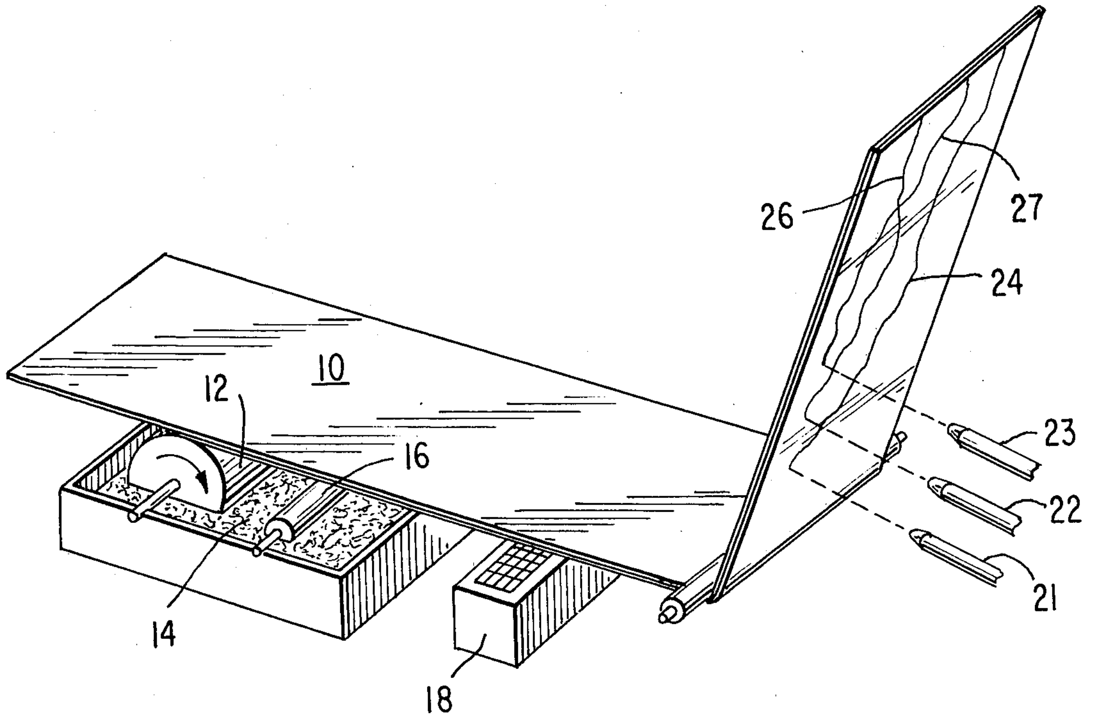
10
12
14
16
18
21
22
23
24
26
27

MULTICOLOR JET PRINTING

DESCRIPTION

1. Technical Field

This invention relates to jet printing and particularly to producing multicolor, high density, surface-adherent images on a substrate through jet printing while minimizing the clogging, or fouling, of the jet nozzles.

2. Background Art

The printing of images in a plurality of colors is highly desirable and advantageous over monocolor printing whether the image is for esthetic purposes, or for conveying intelligence. It is also desirable, economical and extremely rapid to produce multicolor images by a jet printing process wherein a plurality of streams of ink droplets are directed against a substrate from a plurality of nozzles, the streams being controlled by computer input.

Multicolor jet printing, however, has not, as yet, come into widespread use because of practical problems involved in obtaining dense, surface-adherent images, without the clogging or fouling of the jet nozzles.

Jet nozzles, of necessity, are of very fine bores so that small droplets will be ejected because images of high resolution require a large number of very small droplet impact areas. High density color images require ink droplet compositions having high concentrations of dyes. Such compositions are inherently of high viscosity and tend to clog the jet nozzles. In addition, jet printing ink compositions frequently contain dissolved resinous materials to improve adhesion of the droplets to a substrate; and the dissolved resins exacerbate the viscosity problems and form plugs in the nozzle when the composition dries therein.

The problems are particularly acute when it is desired to provide a multicolor print on a transparent substrate, as in the production of colored overlays, because transparent materials are frequently non-absorbent to inks and require resins in the ink compositions for adhesion. The problems are also acute when it is desired to provide a color-fast multicolor print on a textile material because jet printing on textiles usually requires high dye concentrations in the jet printing compositions.

SUMMARY OF THE INVENTION

In accordance with the present invention there is provided a method of printing a multicolor image on a substrate comprising providing a first jet printing nozzle at a fixed distance from said substrate, providing relative transverse movement between said first jet printing nozzle and said substrate while ejecting from said first jet printing nozzle and toward said substrate a first stream of individual image forming liquid droplets comprising a first image forming composition, providing at least a second printing nozzle at a fixed distance from said substrate, providing relative transverse movement between said second jet printing nozzle and said substrate while ejecting from said jet printing nozzle and toward said substrate a second stream of individual image forming liquid droplets comprising a second image forming composition, each of said first and second image forming compositions containing a different substantially colorless material capable of being converted to a colored material by reaction with a chemical agent, and said substrate having a surface composition comprising a chemical agent capable of converting said first image forming composition to a material of one color and said second image forming composition to a material of another color.

The term "substantially colorless," as used herein, relates to materials which do not have colors of sufficient intensity to make the material suitable for dyes.

In the preferred embodiment of the invention, the chemical agent at the surface of the substrate is a diazonium salt and the first and second image forming compositions are different coupling agents for diazonium salts capable of producing azo dyes of different colors.

It is known that azo dyes may be used to produce multicolor images by jet printing. Freytag, et al. U.S. Pat. No. 3,889,271 discloses a multicolor jet printing process utilizing azo dyes for yellow and magenta colored images and a copper phthalocyanine dye for a cyan colored images. The azo dyes in this patent, however, are total dyes in the droplets propelled through the jet nozzles to the substrate, rather than being formed in situ on the substrate as in the instant invention. Further, the azo dyes in the Freytag, et al. patent are prepared by methods which do not involve the simple addition of one substantially colorless material to another.

It is a feature of the instant invention that a substantial portion of the weight of the dye required for a dense image is on the substrate before the jet printing and need not be carried to the substrate in the liquid droplets. This enables the use of image forming compositions of lower solute concentrations and therefore lower viscosities and less susceptibility to clogging.

The chemical agent is advantageously dispersed in a colorless resinous coating on the substrate, particularly when the substrate is transparent and non-absorbent. Methods for producing adherent, transparent resinous coatings on transparent non-absorbent substrates, even on glass, are known in the art. It is technologically much easier to provide an adherent resinous coating on a non-absorbent substrate prior to jet printing under coating conditions of choice than to provide adhesion in the jet ink droplets during the ink application process under limited spatial and time parameters. Once the diazonium salt is firmly adhered to the substrate in a resinous coating, the coupling agents are easily bound to the substrate through the chemical combination of the diazonium salt to the coupling agents. Good bonding of the colored indicia is thus achieved without the necessity of including a resinous material in the image forming compositions ejected through the jet nozzles. This factor also contributes to the minimization of jet nozzle clogging because resinous solutions tend to leave cohesive residues upon drying and cohesive residues are more likely to produce clogging than powdery residues.

The techniques of ink jet printing, including the mechanical aspects thereof and computer control features are known in the art. Exemplary of the current literature on ink-jet printing include Kamphoefner, *Ink-Jet Printing,* I.E.E.E. Transactions on Electron Devices, Volume 19, No. 4 (April 1972) p. 584; Carnahan, *Ink Droplet Printing Devices,* Tappi, Volume 58, No. 7 (July 1975) p. 82; Antos et al., *Digitized Image Display Using Ink-Jet and Laser Printing Technique,* Journal of Applied Photographic Engineering, Vol. 2, No. 4 (Fall 1976) pp. 166–175; Sweet, *High Frequency Recording With Electrostatically Deflected Ink Jets,* Vol. 36, No. 2 (February 1965) p. 131. Hertz et al., *Electronic Ink Jet Device,* Society of Photographic Scientists and Engineers-Second International Conference on Electrophotography, pp. 185–189 (Oct. 24–27, 1973).

In the described processes, liquid droplets of a colored dye or ink are propelled from one or more jet nozzles to selected points of impact on a substrate to form dots on the substrate in patterns which may produce a photographic image, or may convey other intelligence. In multicolor processes, there is a plurality of jet nozzles, each propelling droplets of a different color to the substrates to form colored dots on the substrate at the points of impact of the droplets.

In the instant invention, the jet nozzles usually propel droplets of colorless liquid to the substrate, and only a portion of the dye weight is carried in the droplets.

In the preferred embodiment of this invention, azo dyes are produced in situ on the substrate by the reaction of a diazo compound, or diazonium salt, located on the substrate with different coupling agents, or components, projected to the substrate in droplets from different nozzles.

Suitable diazonium salts include 4-diazodiphenylamine sulfate, 1-diazo-4-N,N-diethylaminobenzene chloride, 1-diazo-4-N,N-dimethylamino-benzene chloride, 1-diazo-4-(N-ethyl-N-hydroxyethyl)aminobenzene chloride, 1-diazo-4-(N-methyl-N-hydroxyethyl)amino-benzene chloride, 1-diazo-2,5-diethoxy-4-benzoylamino-benzene chloride, 1-diazo-4-(N-ethyl-N-benzyl) amino-benzene chloride, 1-diazo-4-N,N-dimethylamino-benzene borofluoride, 1-diazo-2,5-diethoxy-4-(4′-methoxybenzoyl)-amino benzene chloride, 1-diazo-4-morpholino-benzene chloride, 1-diazo-4-morpholino-benzene borofluoride, 1-diazo-2,5-dimethoxy-4-p-tolylmercapto-benzene chloride, 1-diazo-2-ethoxy-4-N,N-diethylamino-benzene chloride, 1-diazo-4-N,N-dimethylaminobenzene chloride, 1-diazo-4-N,N-diethylamino-benzene chloride, 1-diazo-2,5-dibutoxy-4-morpholino-benzene chloride, 1-diazo-2,5-dibutoxy-4-morpholino-benzene disulfate, 1-diazo-2,5-dibutoxy-4-morpholino-benzene borofluoride, 1-diazo-2,5-diethoxy-4-morpholino-benzene chloride, 1-diazo-2,5-dimethoxy-4-morpholino-benzene borofluoride, 1-diazo-2,5-dimethoxy-4-morpholino-benzene chloride, 1-diazo-2,5-diethoxy-4-morpholino-benzene borofluoride, 2-diazo-1-naphthol-5-sulfonic acid sodium salt, 1-diazo-4-N,N-diethylamino-benzene borofluoride, 1-diazo-2,5-diethoxy-4-p-tolylmercapto-benzene chloride, 1-diazo-3chloro-4-N,N-dibutylamino-benzene borofluoride, 1-diazo-2,5-diethoxy-4-p-tolylmercapto-benzene borofluoride, 1-diazo-3-chloro-4-N,N-diethylamino-benzene chloride, 1-diazo-2-chloro5-(4′-chlorophenoxy)-4-N,N-diethylamino-benzene chloride, 1-diazo-2-chloro-5-(4′-chlorophenox-N,N-dimethyl amino-benzene chloride, 1-diazo-3-chloro-4-N-methyl-N-cyclohexylamino-benzene borofluoride, 1-diazo-3, 1-diazo-3-chloro-4-N-methyl-N-cyclohexylamino-benzene chloride methyl-4-pyrrolidino-benzene chloride, and 1-diazo-3-methyl-4-pyrrolidino-benzene borofluoride.

All, or most, of the foregoing diazonium salts are available from commercial sources. In some cases, the salts, as commercially available, are complexed with one mole of zinc chloride, or with ½ mole of zinc chloride for improved stability.

The predominant shade of the color of the dye formed when a diazonium salt is reacted with a coupling component is determined by the coupling component. However, a coupling component which produces a blue dye, for example, may produce different shades of blue with different diazonium salts. In some cases, it may be desired to produce a particular shade of a color by blending two or more dyes which include the same coupling component. For this purpose, two or more diazonium salts may be combined on the substrate so that each droplet of the coupling component will produce a blended shade of its predominant color.

Suitable coupling components (and the predominant color of the dyes produced when they react with the diazonium salts) include 2,3-dihydroxynaphthalene-6-sulfonic acid (blue), 2,3-dihydroxynaphthalene-6-sulfonic acid sodium salt (blue), 2-hydroxynaphthalene-3-carboxylic acid ethanol amide (blue), 2-hydroxynaphthalene-3-carboxylic acid-3-N-morpholino-propylamide (blue), 2-hydroxynaphthalene-3-carboxylic acid diethanol amide (blue), 2-hydroxynaphthalene-3-carboxylic acid-N-diethylenetriamine HCl salt (blue), resorcylic acid (brown), 4,6-dichlororesorcinol (brown), 4-bromo-resorcylic acid (red), 4-bromo-resorcylic acid amide (red), resorcinol-mono-hydroxy ethyl ether (yellow-brown, catechol-mono-hydroxy ethyl ether (yellow), 2,5-dimethyl-4-morpholino methyl phenol (yellow), acetoacet-benzylamide (yellow), 1-hydroxy-naphthalene-2-carboxylic acid-3-N-morpholinopropylamide (yellow), cyanoacet-morpholide (yellow), resorcinol-mono-hydroxy ethyl ether (yellow-brown), 1,10-dicyanoacet-triethylene tetramine HCl salt (yellow), trihydroxydiphenyl (yellow-brown), 2-hydroxynaphthalene-3-carboxylic acid-2′-methylanilide (blue), 2-hydroxynaphthalene-3-carboxylic acid-2′-methoxy anilide (blue), 2-hydroxynaphthalene-3-carboxylic acid-3-nitroanilide (blue), 2-hydroxynaphthalene-3-carboxylic acid-2′-methoxy anilide (blue), 4-chlororesorcinol (red-brown), 2,3-dihydroxynaphthalene (purple-blue), diresorcinol sulfide (brown), 1,4-bis-acetoacetethylenediamine (yellow), 2-hydroxynaphthalene-7-sulfonic acid sodium salt (red), 1-hydroxynaphthalene-4-sulfonic acid sodium salt (violet) 2,7-dihydroxynaphthalene-3,6-disulfonic acid disodium salt (blue), phloroglucinol (magenta), 1-phenyl-3-methyl-5-pyrazolone (red), 2-hydroxynaphthalene-3,6-disulfonic acid disodium salt (blue), resorcinol (brown), alpha-resorcylic ethanolamide (red) beta-resorcylic acid ethanolamide (brown), 3-hydroxy-phenyl-urea (yellow), 2,4,3′-trihydroxy diphenyl (brown), and acetoacet-anilide (yellow).

The large number of combinations of diazonium salts and coupling agents provides a wide variety of colors and shades for the indicia produced by droplets at the very small impact areas. However, if a shade is desired which is not obtainable from any single azo dye, the image forming composition propelled from one or more of the jet nozzles in the form of droplets may comprise a mixture of two or more coupling agents.

While azo dyes are preferred as the dyes formed in situ on the substrates in the preferred embodiments of this invention, other systems which form colored dyes from uncolored components may also be used. The jetted droplets from separate jets may, for example, contain different dyes in leuco form which form different colors when impacted onto a substrate containing an oxidizing agent.

THE DRAWING

The FIGURE is a schematic representation illustrating the process of this invention.

Substrate 10, typically a polyester film, is contacted with roller 12 which is partially immersed in solution 14 which contains at least one component of the color forming system, typically a diazonium salt. Solution 14 preferably also includes a resinous component capable of forming an adherent coating on the substrate.

After substrate 10 is contacted with roller 12, excess solution is removed from the surface of the substrate by contacting the substrate on its underside with surface contact means, such as roller 16. The coated substrate is then dried by hot air blower 18.

Thereafter, the coated substrate, carrying at least one component of the color forming system, is fed to means which positions the coated substrate opposite a printing system including jets 21, 22 and 23, each propelling droplets containing a different azo coupling component.

The information to be recorded in the Example may be the levels of three variables to be shown as blue, red and green lines on a graph. The dye coupling component propelled through jet 21 may produce blue line 24 on the substrate, while jets 22 and 23 propel compositions producing red line 26 and green line 27, respectively.

The FIGURE and the foregoing description illustrate the principles of the invention. In most instances, however, the coating of the substrate and the jet printing thereon will take place at different times and places, the coating by a substrate supplier and the printing by a user.

The substrates which may be used in this invention include fibrous and resinous sheet or film materials, and particularly both porous, easily markable materials, such as cellulosic papers, and non-porous, difficulty markable materials, such as transparent polyester films. Fibrous sheet materials include textile materials, both woven and non-woven, which are substantially greater in length and width than in thickness. They include textiles for wearing apparel and also include heavier textile materials, such as rugs and wall hangings.

The coating composition may, if desired be applied to the substrate by brushing, dipping, or spraying instead of by roller.

With non-porous substrates, as indicated above, it is preferred to include a resinous material in the substrate coating composition. Suitable resinous materials include polymers and copolymers of vinyl acetate, and of acrylate and methacrylate esters, and cellulose esters. The resinous materials in the coating composition may be in solution, or may be in the form of emulsions or latices.

The image-forming compositions propelled to the coated substrate by the jets are generally aqueous solutions. However, solutions in other solvents, such as in lower alcohols, or in glycol ethers, are also contemplated.

EXAMPLE

Chemically treated (subbed) polyester film (5 mils thick) is roller coated with the following formulation:

| | |
|---|---|
| Acetone | 6.0 liters |
| Ethanol | 1.6 liters |
| Urea | 20 gm. |
| Deionized water | 150 cc. |
| N—benzyl-methyl-p-diazonium chloride-zinc chloride double salt | 30 gm. |
| Polyvinylacetate (55% in ethanol) | 1.5 liters |

The coating is dried with heated air and is strongly adherent.

The coated film is moved lengthwise in a plane past a bank of three spaced jet printers, each reciprocating in directions sidewise relative to the motion of the film and each receiving separate signals for the timing of its jet impulses. Each jet printer is fed from a separate reservoir, and each reservoir contains a solution of 50 grams of an azo dye coupling agent in a liter of water. In one of the jet printer reservoirs the dye coupling agent is 1-phenyl-3-methyl-5 pyrazolone to produce red dots in its impact areas. The dye coupling agent in a second jet printer reservoir is 2-hydroxynaphthalene-3-carboxylic acid-3′-nitroanilide to produce blue dots; and the dye coupling agent in the third jet printer is cyanoacet-morpholid to produce yellow dots.

The jet printing method of this invention is suitable for the recording of all types of information or intelligence that can be conveyed by colored microdots. Simple line graphs illustrating the simultaneous fluctuations of a plurality of variables may be shown in different colors on the same coated substrate. In engineering drawings illustrating flow systems, different colors may be used to illustrate air lines, water lines, gas lines, etc. In topographical plots, different colors may be used to show the area densities of interrelated variables. In addition, differently colored microdots may be used for color photograph reproduction by color facsimile transmission using color separation filters and known techniques.

While this invention may be practiced in many different forms, preferred embodiments have been shown in the drawings and described above in detail with the understanding that this disclosure is to be considered as an exemplification of the principles of the invention and is not intended to limit the invention through the illustrated embodiments. The scope of the invention is pointed out in the appended claims.

What is claimed is:

1. A method of printing a multicolor image on a non-absorbent, transparent substrate comprising providing a first jet printing nozzle at a fixed distance from said substrate, providing relative transverse movement between said first jet printing nozzle and said substrate while ejecting from said first jet printing nozzle and toward said substrate a first stream of individual image forming liquid droplets comprising a first image forming resin-free composition, providing at least a second printing nozzle at a fixed distance from said substrate, providing relative transverse movement between said second jet printing nozzle and said substrate while ejecting from said second jet printing nozzle and toward said substrate a second stream of individual image forming liquid droplets comprising a second image forming resin-free composition, each of said first and second image forming compositions containing a different substantially colorless material capable of being converted to a colored material by reaction with a chemical agent, and said substrate having a surface transparent coating comprising a resinous binder containing a chemical agent capable of converting said first image forming composition to a material of one color and said second image forming composition to a material of another color.

2. The method of claim 1 wherein said first and second streams are ejected toward said substrate at the same time.

3. A method of printing a multicolor image on a substrate comprising providing a first jet printing nozzle at a fixed distance from said substrate, providing relative transverse movement between said first jet printing nozzle and said substrate while ejecting from said first jet printing nozzle and toward said substrate a first stream of individual image forming liquid droplets comprising a first image forming composition containing a first azo coupling agent, providing at least a second printing nozzle at a fixed distance from said substrate, providing relative transverse movement between said second jet printing nozzle and said substrate while ejecting from said second jet printing nozzle and toward said substrate a second stream of individual image forming liquid droplets comprising a second image forming composition containing a second azo coupling agent, each of said first and second image forming compositions containing a different substantially colorless material capable of being converted to a colored material by reaction with a chemical agent, and said substrate having a surface composition comprising a diazonium salt capable of converting said first image forming composition to a material of one color and said second image forming composition to a material of another color.

4. The method of claim 3 wherein said first and second image forming compositions are free of resinous materials.

5. The method of claim 3 wherein said substrate surface composition contains at least one resinous material.

6. The method of claim 3 wherein said substrate comprises cellulosic paper.

7. The method of claim 3 wherein said substrate comprises a resinous film.

8. The method of claim 7 wherein said resinous film is a polyester film.

9. The method of claim 3 wherein said substrate comprises a textile material.

10. The method of claim 9 wherein said substrate comprises a woven textile material.

11. The method of claim 9 wherein said substrate comprises a non-woven material.

12. A jet printed substrate comprising a sheet of film material having a coating thereon comprising a diazonium salt and having image microdots of at least two colors thereon, said image microdots of one color comprising a dye of said diazonium salt with at least one azo coupling agent and said image microdots of another color comprising another dye of said diazonium salt with at least one other azo coupling agent.

13. The jet printed substrate of claim 12 wherein said sheet of film material comprises a polyester and said coating includes a resinous binder.

* * * * *